United States Patent
Takashima et al.

(10) Patent No.: US 7,291,266 B2
(45) Date of Patent: Nov. 6, 2007

(54) COMPOSITE FILTER AND METHOD AND APPARATUS FOR PRODUCING HIGH PURITY WATER USING THE COMPOSITE FILTER

(75) Inventors: Seisuke Takashima, Kurashiki (JP); Ryousuke Murayama, Tochigi (JP); Masatoshi Iida, Tochigi (JP); Masayoshi Furuhashi, Tokyo (JP)

(73) Assignee: Iida Kensetu Co., Ltd., Tochigi (JP)

( * ) Notice: Subject to any disclaimer, the term of this patent is extended or adjusted under 35 U.S.C. 154(b) by 228 days.

(21) Appl. No.: 10/499,037

(22) PCT Filed: Dec. 18, 2002

(86) PCT No.: PCT/JP02/13239

§ 371 (c)(1),
(2), (4) Date: Jun. 17, 2004

(87) PCT Pub. No.: WO03/053868

PCT Pub. Date: Jul. 3, 2003

(65) Prior Publication Data

US 2005/0023223 A1 Feb. 3, 2005

(30) Foreign Application Priority Data

| Dec. 20, 2001 | (JP) | .............................. 2001-386827 |
| Apr. 17, 2002 | (JP) | .............................. 2002-114666 |
| Sep. 25, 2002 | (JP) | .............................. 2002-278300 |

(51) Int. Cl.
*C02F 1/42* (2006.01)
*C02F 9/00* (2006.01)
*C02F 9/02* (2006.01)
*C02F 9/08* (2006.01)
*C02F 9/12* (2006.01)

(52) U.S. Cl. .................. 210/266; 210/283; 210/284; 210/290; 210/663; 210/665; 210/669; 210/679

(58) Field of Classification Search ............... 210/266, 210/283, 284, 290, 663, 665, 669, 679
See application file for complete search history.

(56) References Cited

U.S. PATENT DOCUMENTS 3,327,859 A * 6/1967 Pall ............................. 210/266

(Continued)

FOREIGN PATENT DOCUMENTS

JP 10-5743 1/1998

(Continued)

*Primary Examiner*—Thomas M. Lithgow
(74) *Attorney, Agent, or Firm*—Westerman, Hattori, Daniels & Adrian, LLP.

(57) ABSTRACT

To compose a composite filter for obtaining water having a high purity usable as water for life and water for medicine from water in which impurities are mixed. Furthermore, to compose an apparatus for obtaining water having a high purity using the filter. Moreover, to configure the apparatus so as to facilitate exchange of the filter. That is, water having a high purity can be obtained by allowing raw water to permeate through a composite filter which consists of a first layer 11 made of fibers, a second layer 12 made of ion exchange resin, a third layer 14 made of activated carbon and a fourth layer 16 made of an unwoven textile. These first layer, second layer, third layer and fourth layer are configured as separate independent filters respectively so that each filter can be exchanged independently. Furthermore, different kinds of filters can be combined dependently on purposes of use.

18 Claims, 6 Drawing Sheets

U.S. PATENT DOCUMENTS 5,785,848 A * 7/1998 Strand ......................... 210/282
6,197,193 B1 * 3/2001 Archer ........................ 210/266

FOREIGN PATENT DOCUMENTS

| JP | 11-77092 | 3/1999 |
| JP | 2000-15253 | 1/2000 |
| JP | 2000-117264 | 4/2000 |
| JP | 2000-342917 | 12/2000 |
| JP | 2002-320960 | 11/2002 |

* cited by examiner (A)

(B)

(A)

(B)

(C)

(D)

COMPOSITE FILTER AND METHOD AND APPARATUS FOR PRODUCING HIGH PURITY WATER USING THE COMPOSITE FILTER

TECHNICAL FIELD

The present invention relates to a composite filter to be used for obtaining water having a high purity which is biologically, biochemically and medically safe, and a method and an apparatus for manufacturing water having a high purity using the filter.

The present invention relates more specifically to a composite filter for manufacturing water having a high purity suited as potable water or the like by removing impurities and the like from water containing impurities, organic substances, etc. and killing microbes harmful to human bodies, and a method and an apparatus for manufacturing water having a high purity using the composite filter.

BACKGROUND ART

In Japan, we are favored with water resources of good qualities and can easily utilize water for life.

However, for those who live in inferior environments such as a troublous district, for example, it is extremely important to reserve water for life and medicine which is biologically and biochemically safe, and obtainable by a simple and convenient method.

Furthermore, there are districts in the world where water contaminated with various kinds of substances is utilized as water for life.

In Japan also, disasters and the like can cause conditions where water having a high quality suited as water for life is insufficient even locally and temporally.

Furthermore, even in districts and countries where water for life and medicine which is biologically and biochemically safe is easily available, there are risks that harmful substances and microbes such as bacteria are mixed by the so-called biological terrorism with water for life and medicine which is considered safe.

There is known no simple and convenient method usable in the above described troubles districts for manufacturing water safe for life and medicine not only by removing impurities and injurious materials but also killing bacteria and the like.

Furthermore, there is neither known a method which permits easily removing injurious materials and killing microbes, for example, at sites to use water for life and medicine when the injurious materials and harmful microbes are mixed in water for life and medicine.

The present invention provides a filter which is to be used for changing water which is unsuited for use as water for life and medicine into water having a high purity.

The present invention provides a method and an apparatus for easily manufacturing water having a high purity from water in which impurities and the like are mixed, therefore being unsuited as water for life and medicine.

Furthermore, the present invention provides a method which permits easily and securely sterilizing water contaminated with microbes such as bacteria.

DISCLOSURE OF THE INVENTION

A composite filter according to the present invention is characterized in that the filter comprises a first layer consisting of fibers or a glass filter, a second layer for adsorbing microbes and inorganic materials with ion exchange resin, a third layer consisting of activated carbon and a fourth layer consisting of a nonwoven textile. A method for manufacturing water having a high quality according to the present invention is configured to manufacture water having a high quality by removing impurities, etc., and making microbes harmless with the composite filter having the above described composition.

A method for manufacturing water which has a high purity and biologically and biochemically safe according to the present invention is a method using the above described composite filter which is configured to kill microbes by irradiating water before or after filtration with ultraviolet rays.

Furthermore, a composite filter according to the present invention comprises a filter consisting of fibers or a glass filter, a filter containing ion exchange resin, a filter containing activated carbon and a filter made of an unwoven textile which are composed individually, and is configured to permit exchanging each filter and appropriately combining the filters.

Accordingly, the composite filter according to the present invention permits reducing a maintenance cost since the composite filter permits individually exchanging filters which have been lowered in performance and unusable.

The apparatus for obtaining water having the high purity according to the present invention comprises a flow path through which water to be purified is to be flowed, and a plurality of filters out of a filter consisting of fibers or a glass filter, a filter containing ion exchange resin, a filter containing activated carbon and a filter made of an unwoven textile which are disposed in the flow path at appropriate intervals, and is configured to permit exchanging the filters.

The composite filter according to the present invention consists of a plurality of layers such as the filter layers described above each of which has a function to remove impurities as described below.

First, the first layer consisting of the textile has a function to remove impurities such as sand other than organic materials and microbes. It is preferable to use as the textile a hydrophobic fibrous material for maintaining favorable water permeability for a long time.

The iron exchange resin layer as the next second filter layer is used for inactivating viruses and pathogenic bacteria.

The activated carbon layer as the third layer is used for removing toxic substances by adsorption.

The lowest layer as the fourth layer is used for removing bacteria such as *cholera bacillus, dysentery bacillus* and *bacillus anthracis* by adsorption.

The present invention provides the composite filter which is composed of the plurality of filter layers as described above, and makes it possible to remove sand and other fine particles of minerals, inorganic matters and the like with the first layer when such particles are contained in water, inactivate and make innoxious harmful organic materials, viruses and microbes with the second layer, remove toxic substances with the third layer, and further eliminate microbes having sizes of 0.5 micrometer to several dozens of micrometers with the fourth layer.

The method using the composite filter according to the present invention makes it possible to remove most of impurities contained in water owing to the functions of the layers different from one another as described above, thereby removing and making innoxious substances harmful to human bodies in particular.

Furthermore, the other method for manufacturing water having a high purity according to the present invention is configured to manufacture water having a high purity by mixing a high polymer coagulant with raw water to be filtered and sterilized for coagulating and removing impurities, and allowing the water to permeate through the composite filter.

This method makes it possible to remove sand and the like on the submicron order which cannot be removed with the first layer of the composite filter.

Furthermore, it is possible to annihilate harmful microbes and bacteria almost completely and obtain water having a high purity safer for life, drinking and medicine by irradiating water with ultraviolet while impurities are contained in the filter layers before manufacturing steps or after the manufacturing steps of the method for manufacturing water having a high purity in addition to the method for manufacturing water having a high purity using the above described filter layers according to the present invention. In this case, microbes and bacteria can be annihilated or made innoxious nearly completely by irradiating water having permeated through the composite filter.

Furthermore, the apparatus to which the manufacturing method according to the present invention is applied, or the apparatus for manufacturing water having a high purity which uses the composite filter according to the present invention, has a relatively simple configuration, therefore being usable in any district or location, and is capable of removing injurious materials almost completely and making harmful microbes harmless.

BEST MODE FOR CARRYING OUT THE INVENTION

Description will be made of an embodiment of a composite filter for manufacturing water having a high purity biologically, biochemically and medically safe according to the present invention.

Figure 1:
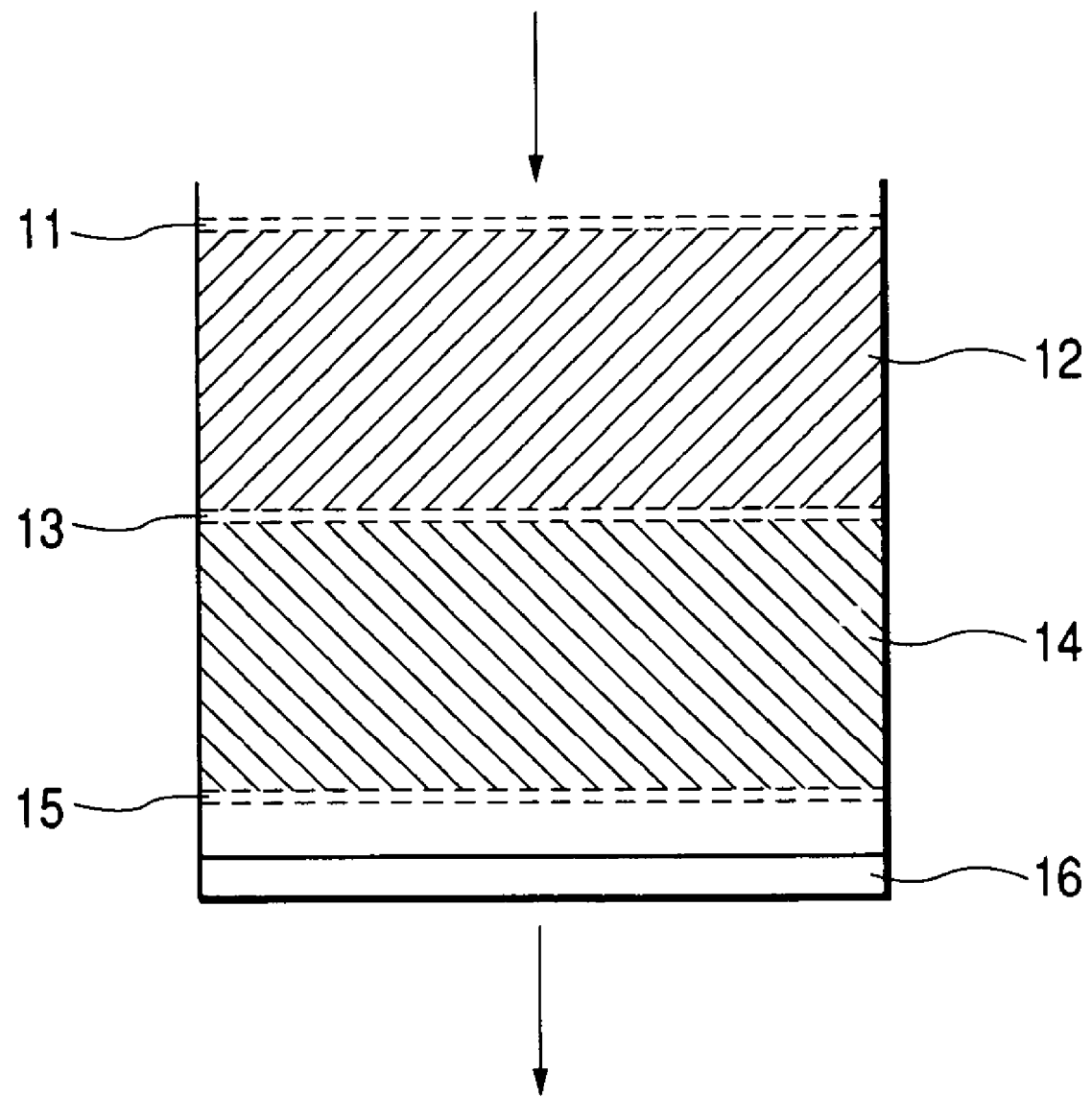
FIG. 1 is a diagram showing a configuration of a composite filter according to the present invention.

This composite filter has a configuration shown in FIG. 1. In FIG. 1, a reference numeral 11 represents a first layer which is a dust-proof filter consisting of a textile, a reference numeral 12 designates a second layer consisting of a cation exchange resin layer, a reference numeral 13 denotes a stainless steel mesh, a reference numeral 14 represents a third layer consisting of an activated carbon layer, a reference numeral 15 designates a stainless steel mesh and a reference numeral 16 denotes a fourth layer which is a sterilizing filter consisting of an unwoven textile.

Now, description will be made of a function of each layer of the composite filter and a function of the composite filter shown in FIG. 1 as a whole.

Since raw water in an inferior condition where fine particle like sand is suspended is to be treated with the composite filter according to the present invention, it is first necessary to remove fine particle like substances such as the sand.

Fibers made of a hydrophobic material, for example, fibers made of polyester or a glass filter is suited to remove particles having particle diameters of 0.01 to 1 mm out of such particle like substances. In other words, the hydrophobic fibers can maintain a favorable water permeating effect for a longer time than hydrophilic fibers.

For this reason, the above described dust-proof filter is used as the first layer 11 by the present invention.

Viruses can be inactivated by using the ion exchange resin layer as the second layer 12.

It is desirable to use $SO_3H$ type ion exchange resin as the ion exchange resin in the composite filter according to the present invention.

One of the inventors of the present invention has found that the $SO_3H$ type is more effective than an $SO_3Na$ type for inactivating B type antigen to hepatitis and acquired human immunity abnormal syndrome virus (Takashima et al.: Japan Medical Instrument Academy Magazine, 56: 499, 1986 and Japan Artificial Organ Academy Magazine, 18: 1372, 1989). This is traced to a consideration that virus particles are adsorbed by the ion exchange resin due to chemical coupling between sulfonic radical of the ion exchange resin and amino group on a surface of virus, whereby protein is denatured and inactivated. The above described ion exchange resin is therefore effective also not only for viruses of smallpox, ebora hemmoragic fever and rassa hemmoragic fever but also pathogenic bacteria since surfaces of these viruses and bacteria are covered with films of protein.

This ion exchange resin also has a merit that the resin can be activated again by washing it with an aqueous solution of hydrochloric acid at normality of 0.01 to 0.1 when performance of the resin is degraded.

Then, the stainless steel mesh 13 which has a size a little smaller than a particle diameter of the ion exchange resin is disposed as a layer under the cation exchange resin to prevent the cation exchange resin from being mixed with the activated carbon.

The activated carbon (the third layer 14) originally exhibits a higher deodorant effect as the activated carbon has a larger surface area per unit weight and is used in a water purifier usually at a ratio of 10 to 100 m/g though different dependently on specifications.

The composite filter according to the present invention utilizes this effect and since activated carbon exhibits a high function to adsorb and remove chemical substances which have molecular weights of 50 to 1000, not only sarin ($C_4H_{10}FD_2P$, molecular weight: 140) which is feared to be used for chemical terrorism, for example, but also general toxic substances which have molecular weights on the order of 100 to 200 can be removed efficiently by activated carbon.

Though granular carbon or crushed carbon manufactured from coconuts may be used as the activated carbon in the composite filter according to the present invention, granular carbon has a higher packing ratio per unit weight and therefore exhibits higher removing performance.

The stainless steel mesh is inserted as described above so that a weight burden of upper layers of the ion exchange resin and the activated carbon is lessened on the unwoven textile used as a layer under the stainless steel mesh.

Furthermore, packed in the lowermost layer 16 are one to five overlapped sheets of an unwoven textile of hydrophobic polyester or polyethylene which has a pore diameter of 1 to 20 μm in a dry condition so that the lowermost layer 16 has a sterilizing function.

Bacteria have sizes different dependently on kinds of bacteria, and it is considered that a *cholera bacillus* has a size of 1 to 20 μm, a *colon bacillus* has a size of 0.5×1.0 to 3.0 μm, a typhoid *bacillus* has a size of 2 to 3.0 μm, a *dysentery bacillus* has a size of 0.5 to 0.7×3 μm and a *bacillus anthracis* has a size of 1×3 to 4 μm (Medical Instrument Engineering Series 1 Sterilizing Method-Disinfecting Method Collection 1 supervised by Japan Medical Instrument Academy, pp 43 to 46).

Though it is anticipated that a pore diameter of an unwoven textile is somewhat swollen when brought into contact with water, swelling is not so remarkable since a material of the unwoven textile is a hydrophobic high polymer substance.

Furthermore, though the diameter is a little larger than sizes of bacteria, it is possible to prevent bacteria from passing through an unwoven textile when the textile is overlapped in a plurality.

Furthermore, it is sufficient that the unwoven textile has a pore diameter on the order of 0.5 to 1.0 μm since almost of all bacteria are adsorbed and removed while passing through the cation exchange resin layer disposed in an upper section. Reversely, it is not preferable to use an unwoven textile having a smaller pore diameter since such a pore diameter lowers a water permeability.

The cation exchange resin (sulfonic acid $SO_3H$) exhibits a high sterilizing effect and virus killing effect in the composite filter according to the present invention.

When raw water has high hardness, however, the cation exchange resin may be inactivated due to coupling with calcium ions.

In order to solve this problem, it is desirable to mix any of zeolite, silica and alumina-based acid clay with the cation exchange resin. The silica and the alumina-based acid clay has acidic surfaces at pH 1 to 5. It is therefore possible to prevent the cation exchange resin from being inactivated by mixing silica or acid clay with the cation exchange resin.

Furthermore, zeolite has a large specific surface area (20 to 100 $m/cm^2$) and exhibits synergistic effect when combined with the activated carbon used in the composite filter according to the present invention, thereby strengthening adsorbing power and enhancing bacteria removing function and the like.

When zeolite is to be mixed with the cation exchange resin in the composite filter according to the present invention, for example, a mixing ratio is freely modifiable. Speaking concretely, mixing ratios between the cation exchange resin and zeolite are 5 to 95:95 to 5, but a ratio of 50:50 is usually most desirable taking a water softening effect into consideration.

Figure 2:
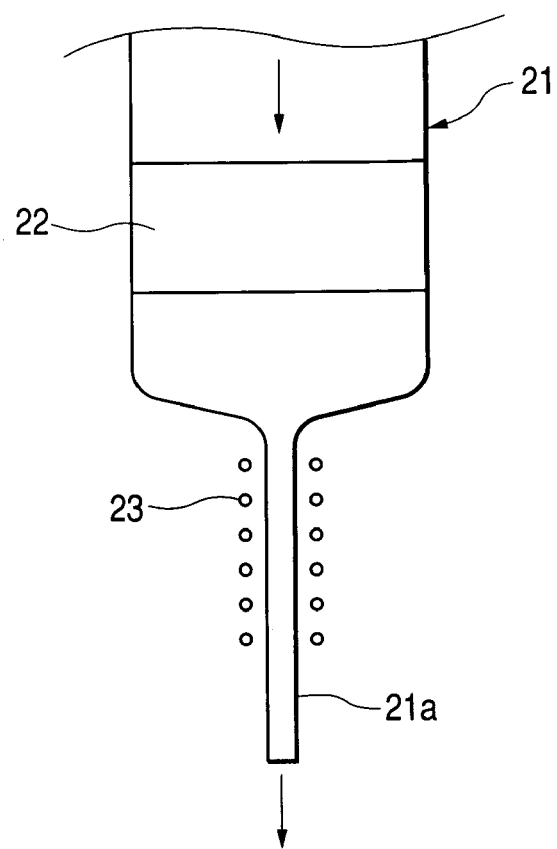
FIG. 2 is a diagram showing an outline of steps of a manufacturing method according to the present invention.

The method for manufacturing water having a high purity according to the present invention is configured to use an apparatus having such a configuration, for example, as shown in FIG. 2.

In this drawing, a reference numeral 21 represents a flow path composing member through which water to be highly purified is to be flowed and a composite filter 22 is disposed in the flow path composing member 21. A reference numeral 23 designates an ultraviolet lamp which is disposed so as to surround a flow path 21*a* at a location of the flow path where water having passed through the composite filter is to flow.

The apparatus having such a configuration is capable of reducing free particle to an extremely trace amount by allowing raw water to pass through the composite filter, almost zeroing pathogenic microbes such as bacteria and viruses, and providing water having a high purity or a quality guaranteed sufficient as water for life such as potable water.

When water is to be used as water for medicine, however, it is not easy to judge inactivation of viruses even after confirmation of sterility and it is necessary to remove pyrogenous substances such as polyriposaccharide.

The embodiment of the method for manufacturing water having a high purity according to the present invention shown in FIG. 2 is configured to irradiate water having permeated through the composite filter with ultraviolet rays from the ultraviolet lamp.

The inventors found it possible to reduce microbes contained in water to a level far lower than an infections level as a result of researches for sterilizing effects of ultraviolet rays including joint researches with a medical department of Toho University and earnest examinations of ultraviolet resistance characteristics of various microbes to ultraviolet rays which have been accumulated till now.

Microbes are roughly classified into bacteria and cumycetes. The bacteria are classified dependently on whether they are positive or negative to gram dyeing, whether or not they breed pores and their physiological characteristics.

The cumycetes generally have higher ultraviolet resistance characteristics than the bacteria. Out of bacteria, budding fungi, *bacillus subtilis* and *bacillus anthracis* have high ultraviolet resistance characterisies.

However, so high an irradiating intensity is not necessary to kill 90% of a colony of any microbe which covers an entire culture medium of a petri dish having a diameter of 10 cm and even *aspergillus niger* which has the highest ultraviolet resistance characteristic requires 132 $mW·sec/cm^2$ at highest which is illuminance easily available with an ordinary ultraviolet lamp. Speaking of the bacteria, on the other hand, sercina letea requires an exceptionally high value of 19.7 $mW·sec/cm^2$. Even in a *bacillus* genus which has a relatively high ultraviolet resistance characteristic, a spore of *bacillus subtilis* having the highest ultraviolet resistance characteristic requires 12.0 $mW·sec/cm^2$, whereas 7.1 and 4.5 $mW·sec/cm^2$ are sufficient for *bacillus subtilis* and *bacillus anthracis* respectively. Therefore, microbes contained in water is killed completely when illuminance is 20 $mW·sec/cm^2$ at all locations in a container.

Out of ultraviolet rays having functions to kill microbes, ultraviolet rays within a UV-C region at wavelengths from 200 nm to 280 nm exhibit strongest functions to kill various kinds of microbes having different compositions and natures, and an ultraviolet ray having a wavelength of 254 nm in particular has a strongest sterilizing function.

Speaking concretely, it has been confirmed that even bacteria which have endo-spores like *bacillus anthracis* and ultraviolet resistance characteristics a little higher than that of methicillin resistant *staphylococcus* aurous are killed almost completely for 10 to 20 seconds at illuminance of 10 $mW·sec/cm^2$.

The manufacturing method according to the present invention makes it possible to remove and make harmless microbes and bacteria by passing water through the composite filter as described above. Even when microbes and the like are partially contained in water which has passed through the composite filter, however, the microbes can be killed and made harmless completely by irradiating the water with ultraviolet rays.

In the embodiment shown in FIG. 2, a time of irradiation with ultraviolet rays required for completely killing microbes, bacteria and the like is determined dependently on an intensity of rays from the ultraviolet lamp disposed spirally around the flow path. A length of the ultraviolet lamp, a diameter of the flow path and a water flow rate in the flow path are to be determined dependently on an intensity of rays from the ultraviolet lamp.

When sand and the like mixed in raw water contain fine particles such as sand on the submicron order and clay, the fine particles may not be filtrated with the first layer of the above described composite filter.

In order to remove such fine particles, it is desirable to throw a high polymer flocculant such as polyamide into ray water for agglomerating and precipitating the fine particles, and lead water into the purifier according to the present invention after supernatant water has been taken out.

Figure 3:
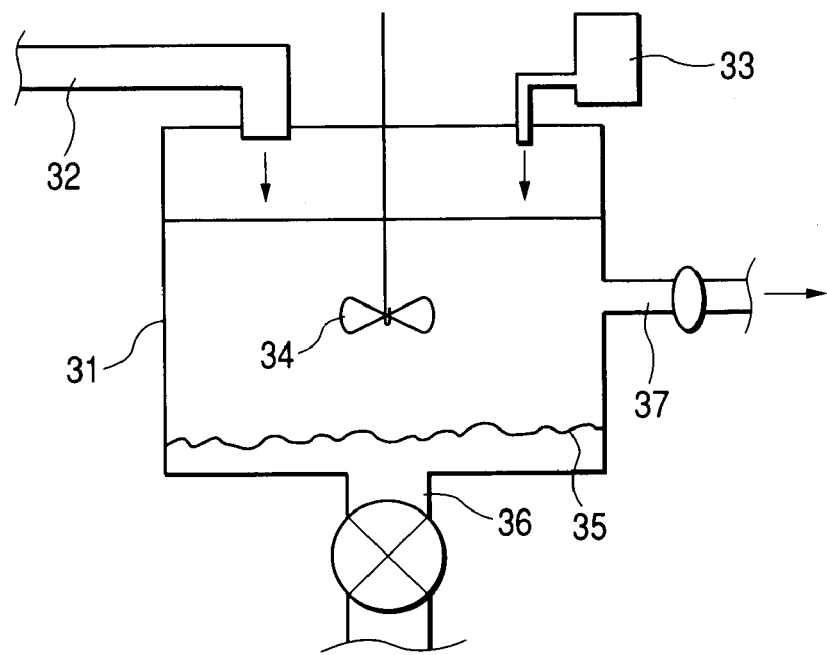
FIG. 3 is a diagram showing a method for agglomerating fine particles.

FIG. 3 is a diagram showing an outline of an agglomerating-precipitating apparatus. In FIG. 3, a reference numeral 31 represents a precipitating tank, a reference numeral 32 designates a raw water inlet, a reference numeral 33 denotes a flocculant to be added, a reference numeral 34 represents an agitator, a reference numeral 35 designates an agglomerate, a reference numeral 36 denotes an agglomerate outlet and a reference numeral 37 represents an outlet to the purifier.

In the agglomerating-precipitating apparatus shown in FIG. 3, raw water is poured from the raw water inlet 32 into the precipitating tank 31. At the same time, a high polymer flocculant 33 such as polyacrylamide is added into the precipitating tank 31. Accordingly, the sand on the submicron order, clay and the like are made into the agglomerate 35 and precipitated. Precipitate (sludge) is taken from the agglomerate outlet 36. When the sand and clay are agglomerated and precipitated, a supernatant portion 26 becomes water from which the fine sand on the submicron order has been removed and is sent into the purifier from the outlet 37.

Then, water having a high purity is manufactured through the steps already described above.

Figure 4:
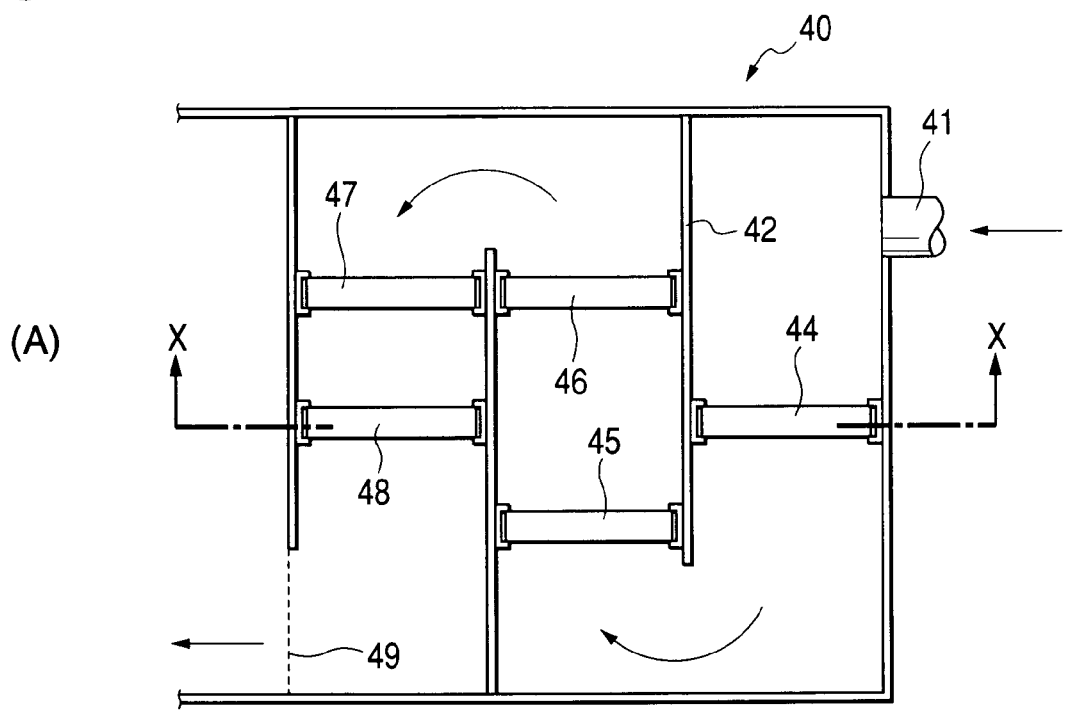
FIG. 4 is a diagram showing an embodiment of an apparatus according to the present invention.
Figure 4:
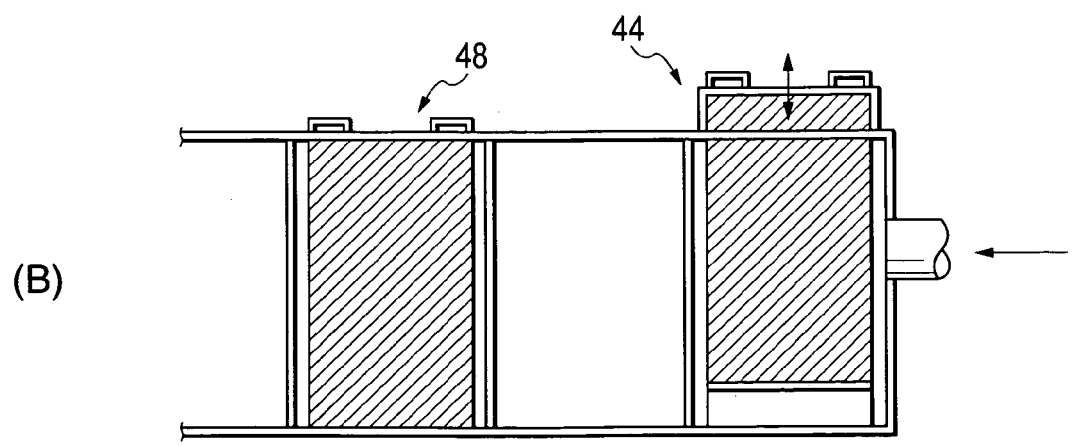

FIG. 4 is a diagram showing an embodiment of an apparatus for manufacturing water having a high quality or water at least suited as potable water from fouled water using the method according to the present invention.

In this embodiment of the present invention, layers are disposed separately in contrast to the first to fourth layers of the composite filter according to the present invention shown in FIG. 1 which are partitioned by the stainless steel meshes respectively and arranged integrally.

Figure 5:
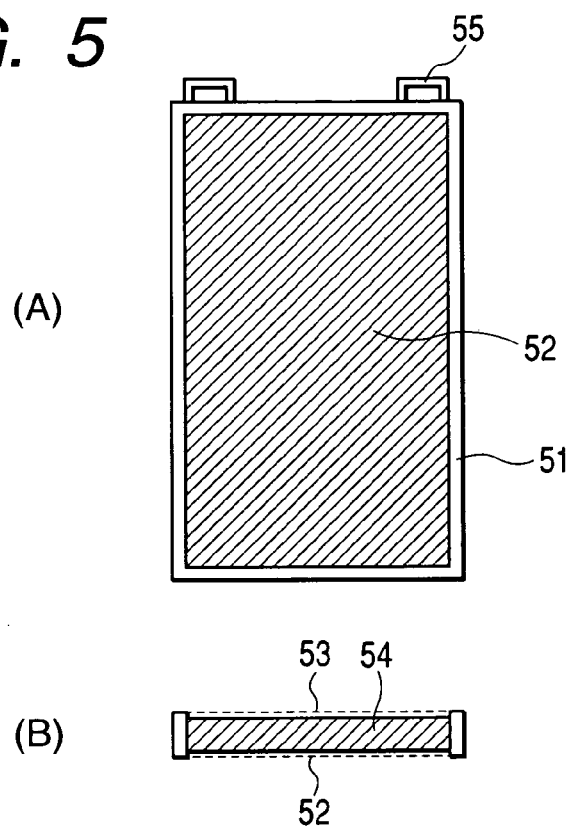
FIG. 5 is a diagram showing a configuration of a filter to be used in the apparatus shown in FIG. 4.

Speaking concretely of the embodiment shown in FIG. 4, first to fourth layers are configured as separate independent filters as shown in FIG. 5 and disposed at intervals in a flow of water to be purified.

When the first, second, third and fourth layers of the composite filter according to the present invention shown in FIG. 1 are configured as the separate independent filters as described above, it is conceivable to utilize the composite filter in various ways as described below.

First, the composite filter allows the separated filters to be exchanged individually or permits exchanging only filters which are old and have lowered efficiencies.

Furthermore, dependently on purposes of use of the composite filter, even filters which have an identical role can be exchanged with filters which are different in their effects or the like.

It is preferable, for example, to use the filters selectively dependently on degraded conditions of a water quality, for example, when water having a low quality is purified into potable water.

It is preferable, for example, to use filters having different capabilities for water which has a quality not so low and water which has a low quality.

As the first layer for removing fine particle like substances such as sand, it is possible to selectively use, other than the above described fibrous filter, one of appropriate filters which use stainless steel meshes having different roughness dependently on penetrating ratios and particle diameters of the fine particle like substances.

Furthermore, it is desirable to use different kinds of layers dependently on kinds and mixed ratios of viruses as the second layer which functions as the ion exchange layer.

Furthermore, the third layer in which activated carbon is mixed exhibits a higher deodorant effect and a stronger power to adsorb harmful chemical substances as the layer has a larger surface area per unit weight (or unit volume) as described above.

It is therefore desirable to use a filter in which activated carbon having a small diameter is mixed for purifying water in which chemical substances are mixed in a large amount. However, the filter in which activated carbon having the small particle diameter is mixed hinders a water flow, thereby lowering a purifying efficiency. Therefore, such a filter is not preferable for use at a site of water purification where a small amount of mixed chemical substances is preliminarily known since the filter prolongs a treating time meaninglessly.

When a degree of contamination with the chemical substances is known as described above, it is desirable to use activated carbon which has a particle diameter corresponding to the degree of contamination.

In other words, it is desirable to selectively use activated carbon dependently on qualities of water to be purified.

It is desirable to use activated carbon which has different particle diameters (appropriate particle diameters) as described above.

Furthermore, a purifying capability is lowered due to adhesion of impurities as each layer (first, second, third or fourth layer) is used continuously. Exchange of the layer is therefore required. Moreover, in case of the composite filter shown in FIG. 1 in which all the layers are integrated, it is necessary to exchange all the layers even when a capability of only one layer is lowered.

It is therefore preferable to configure the first to fourth layers as separate filters which can be exchanged separately.

A purifier according to the above described embodiment shown in FIG. 4 utilizes the composite filter according to the present invention which is divided into a plurality of independent filters.

In FIG. 4, a reference numeral 40 represents a purifier, a reference numeral 41 designates an inlet port, a reference numerals 42 and 43 designate partitions for forming a flow path, reference numerals 44, 45, 46, 47 and 48 denote filters in which ion exchange resin, activated carbon and the like are mixed, for example, as shown in FIG. 5.

That is, the filter is composed of ion exchange resin or activated carbon which is enclosed in a space 54 which is formed by attaching meshes such as stainless steel meshes to front and rear surfaces 52 and 53 of a frame 51 made of stainless steel or the like. A reference numeral 55 represents a grip to be used for exchanging a filter 50.

This purifier allows water to be purified to flow from the inlet port and pass through the filters 44, 45, 46, 47 and 48 while flowing through a flow path indicated by arrows, thereby providing a purifying effect identical to that of the composite filter which uses the first, second, third and fourth integrated layers shown in FIG. 1.

Water which has passed through the composite filter according to the present invention is purified and flows from outside the apparatus from an outlet port 49 for use as potable water or the like.

When harmful bacteria may be mixed, it is sufficient for sterilization to dispose a quartz pipe or the like as a flow path beyond the outlet port 49 and arrange an ultraviolet lamp around the flow path for irradiation as shown in FIG. 2.

For sterilization with the ultraviolet rays, it is possible to use, in place of the configuration shown in FIG. 2, a ultraviolet irradiation tank which is connected to the outlet port 49 of the purifier shown in FIG. 4 and equipped with an ultraviolet lamp so that sterilization is carried out in the tank with ultraviolet rays.

Figure 6:
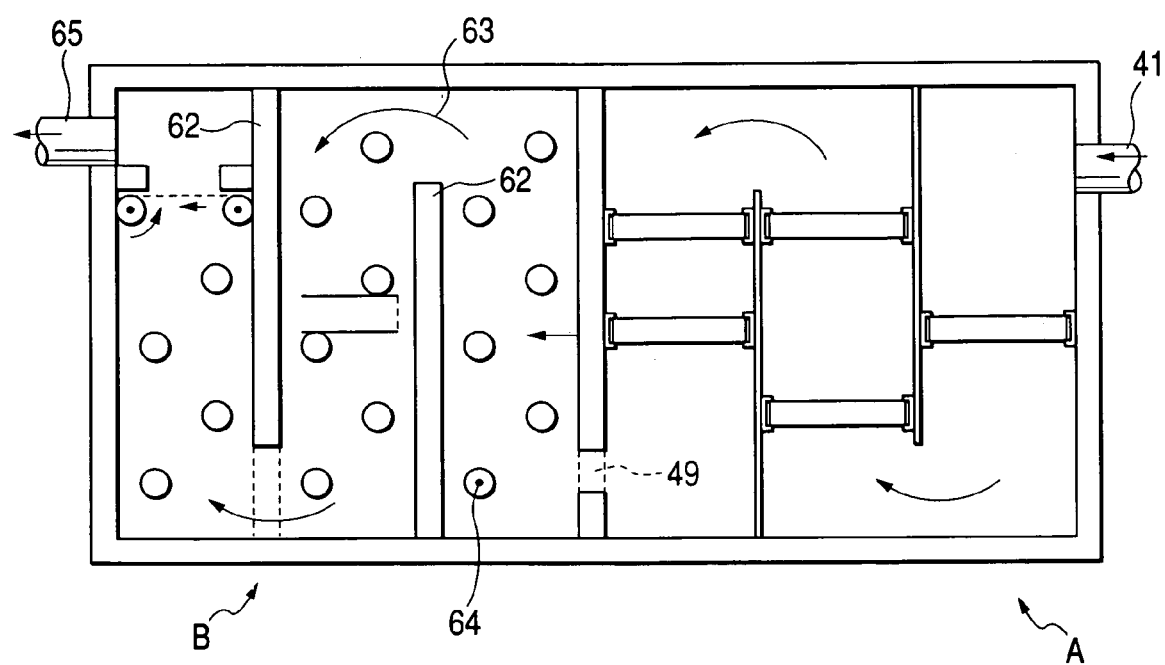
FIG. 6 is a diagram showing another embodiment of the apparatus according to the present invention.

A second embodiment of the apparatus according to the present invention shown in FIG. 6 is an apparatus configured to provide safer potable water by killing some bacteria which cannot be removed and remain in the apparatus according to the present invention shown in FIG. 4.

The apparatus according to the second embodiment is a combination apparatus or integrated apparatus which consists of the apparatus according to the first embodiment shown in FIG. 4 and an apparatus which has already been developed and filed by the inventors, thereby being capable of performing removal of impurities and other substances as well as removal and sterilization of microbes almost completely. Moreover, the apparatus according to the second embodiment is capable of purifying a large amount of water at a high efficiency.

In the apparatus according to the second embodiment shown in FIG. 6, section A is the purifier shown in FIG. 4 and section B is an apparatus for killing the bacteria with ultraviolet rays.

The ultraviolet irradiation tank B is configured to dispose a partition wall 62 to form a flow path 63 indicated by an arrow as in the purifying tank B identical to that shown in FIG. 4. An ultraviolet lamp 64 is disposed in the flow path 63.

The apparatus according to the second embodiment removes various kinds of impurities and harmful chemical substances in the purifying tank A as described with reference to the first embodiment. Water which has been purified as described above comes out of an outlet port 49 of the purifying tank A, enters the ultraviolet irradiation tank B from an inlet port 61 and flows through the flow path 63. The water is sterilized with ultraviolet rays from the ultraviolet lamps 64 while flowing through the flow path 63.

Accordingly, water supplied from an outlet port 65 of the ultraviolet irradiation tank B has an extremely high purity and usable as extremely safe potable water.

It is desirable to change an irradiating intensity of the ultraviolet rays dependently on whether microbes, bacteria in particular, mixed in water to be purified are in large or small amounts. Speaking concretely, a high sterilizing effect is obtained and secure sterilization is carried out by irradiating water containing small amounts of bacteria with a large amount of ultraviolet rays. However, energy is used in waste. In contrast, irradiation with a small amount of ultraviolet rays is risky since bacteria mixed in a certain amount are not killed by such irradiation.

It is therefore desirable to dispose detecting-monitoring means as in the purification system filed by the above described application.

Now, description will be made of a third embodiment in which means for detecting and monitoring bacteria and the like is combined with the above described second embodiment.

This detecting-monitoring means uses a ray (ultraviolet ray) which has a wavelength out of wavelengths of 200 nm, 260 nm and 400 nm, a ray having the wavelength of 200 nm in particular, in a flow path from the outlet port 65 of the ultraviolet irradiation tank or a bypassed flow path and is capable of measuring absorption by microbes as absorbance with an extremely high accuracy, thereby being capable of detecting presence or absence of the microbes.

Furthermore, the inventors of the present invention paid attention to a fact that various kinds of bacteria including calillus anthracis and other harmful microbes contain albumin and another fact that the above described microbes can be detected a accurately by utilizing absorption characteristic of albumin at wavelengths in the ultraviolet region.

Figure 7:
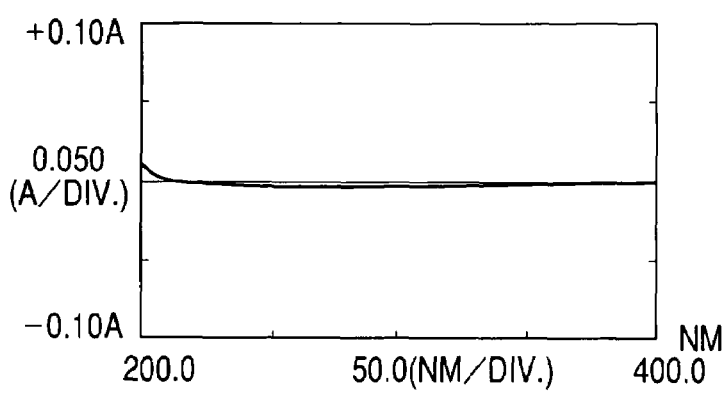
FIG. 7 is diagram showing absorbance of albumin in a ultraviolet wavelength region.
Figure 7:
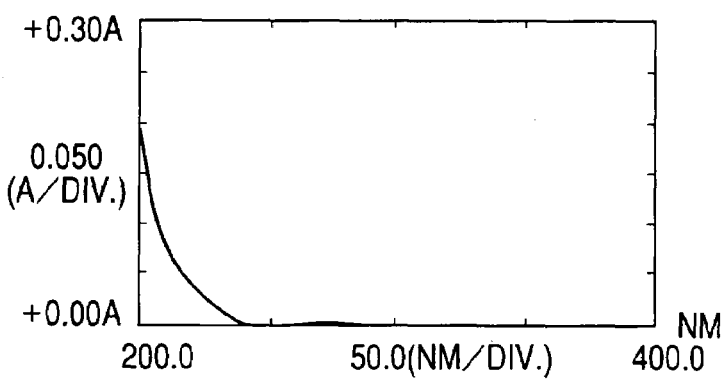
Figure 7:
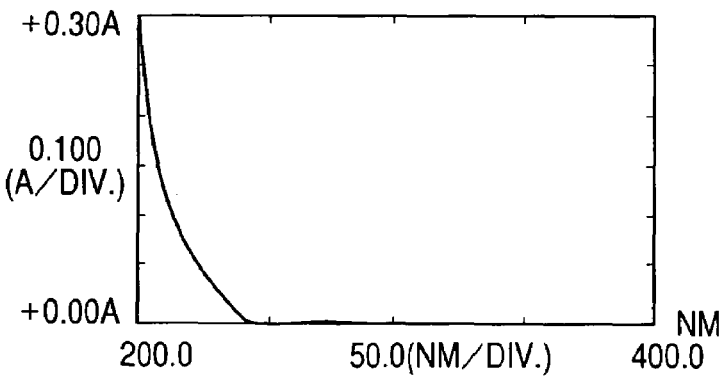
Figure 7:
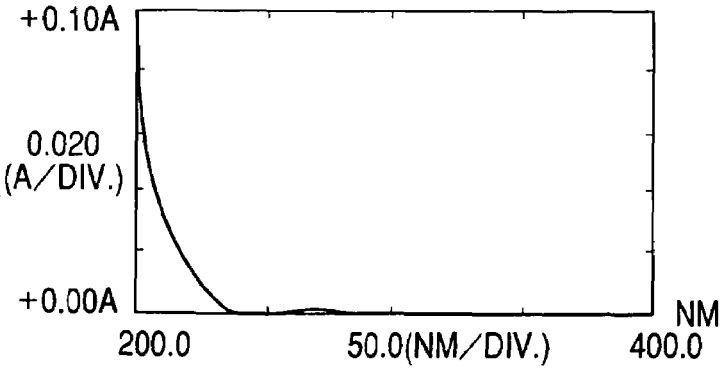

FIG. 7 is a diagram showing an absorption spectrum of an aqueous solution of albumin in the ultraviolet region. In this drawing, (A) is absorbance of a cell itself used for measurements or a measured result for checking cleanness of the cell itself, and (B), (C) and (D) are measured results of aqueous solutions which contained albumin at 14 ppm ($1.4 \times 10^{-5}$ g/ml), 2.8 ppm ($2.8 \times 10^{-6}$ g/ml) and 0.28 ppm ($2.8 \times 10^{-7}$ g/ml) respectively. In addition, an abscissa represents wavelength in a unit of nanometer and an ordinate represents absorbance.

As apparent from these measured results, albumin exhibits remarkable absorption at the wavelength 200 nm and slight absorption also at 260 nm and 400 nm.

As understood from the measured results described above, the harmful microbes can be detected extremely accurately by measuring the above described absorbance using ultraviolet rays having the wavelengths of 200 nm, 260 nm and 400 nm. Detecting using ultraviolet rays at the wavelength 200 nm in particular is desirable since absorbance is high at this wavelength.

When the ultraviolet rays at 200 nm is used, however, the ray provides an extremely high sensitivity to detect an extremely small amount of microbes, allowing water to be usable quite harmless potable water. It is therefore desirable to set absorbance at such a level as not to stop water supply so far as water is quite harmless.

Furthermore, a wavelength to be used for detection may be switched between the wavelengths 260 nm and 400 nm at which a sensitivity is not so high (absorbance is low).

Figure 8:
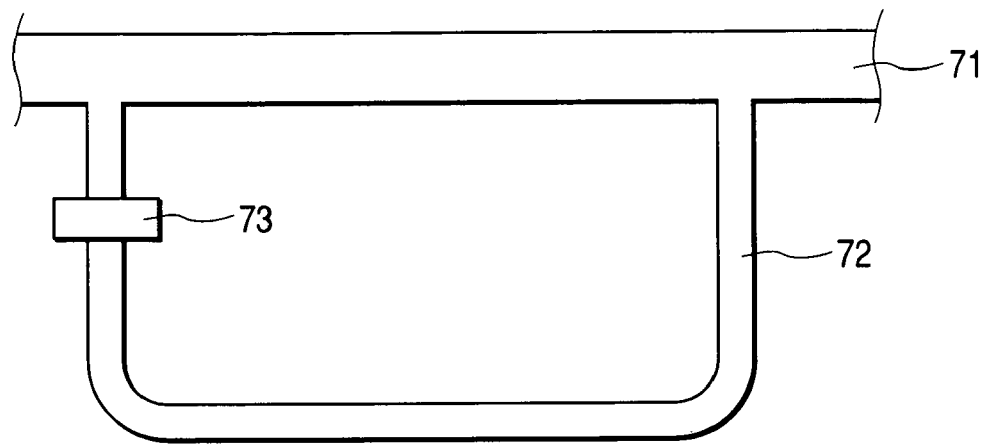
FIG. 8 is a diagram showing an arrangement example of a detecting-monitoring unit to be used in the apparatus according to the present invention.

FIG. 8 shows an arrangement example of a detecting-monitoring unit 73 in a purification system. In FIG. 8, a reference numeral 71 represents a flow path for purified water which is connected, for example, to the outlet port 65 of the apparatus shown in FIG. 6, a reference numeral 72 designates a bypass in which the detecting-monitoring unit 73 is to be disposed and it is preferable to lead water from the flow path 71 into the bypass 72 as shown in this drawing. The detecting-monitoring unit 73 is disposed in the bypass 72. In addition, a detecting unit may be disposed directly in the flow path 71.

Figure 9:
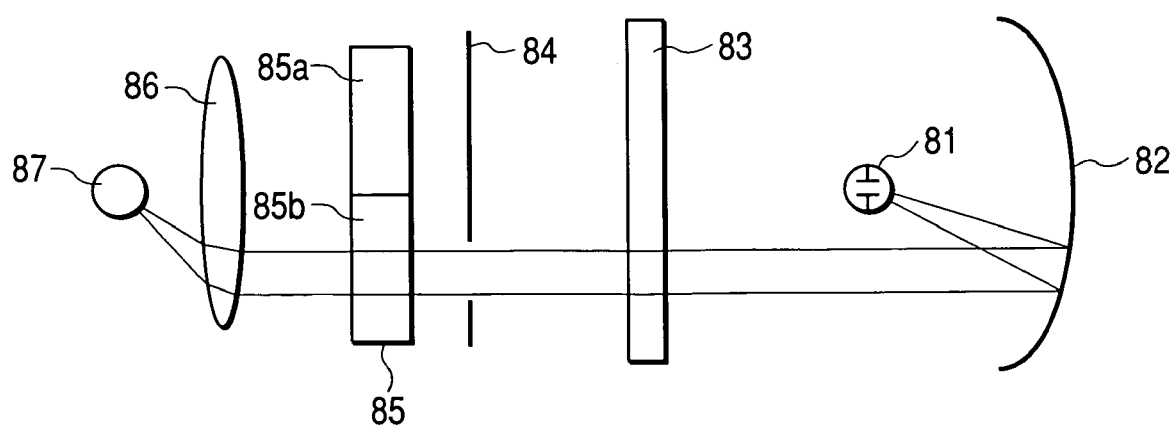
FIG. 9 is a diagram showing a configuration of the detecting-monitoring unit to be used in the apparatus according to the present invention.

FIG. 9 is a schematic diagram showing a configurational example of the detecting-monitoring unit, in which a reference numeral 81 represents a deuterium discharge lamp for emitting ultraviolet rays within a wavelength region of 200 nm to 400 nm. A reference numeral 82 designates a concave mirror for paralleling rays emitted from the deuterium discharge lamp 81, a reference numeral 83 denotes a filter (an interference filter) for obtaining any one of rays from the deuterium discharge lamp 81, for example, only one rays at 200 nm, 260 nm and 400 nm or a spectroscopic apparatus which uses a diffraction grating, a reference numeral 84 represents a semicircular chopper rotating at a high speed, a reference numeral 85 designates a quartz cell containing sample water 85a and ultrapure water 85b, a reference numeral 86 denotes a condenser lens and a reference numeral 87 represents a detector such as a photomultiplier.

A detector shown in FIG. 9 uses the deuterium discharge lamp 81 as a light source. Rays emitted from this discharge lamp 81 have wavelength within a region of 200 nm to 400 nm. The rays (ultraviolet rays) emitted from the deuterium discharge lamp 81 are made by the concave mirror 82 into a parallel light bundle, which is made into a light bundle having a single wavelength (200 nm) after passing through the interference filter 83 allowing only a ray having a wavelength, for example, of 200 nm. Successively, the chopper 84 allows the light bundle to pass alternately through an upper half and a lower half shown in the drawing. Accordingly, the light bundle transmits alternately through the sample water 85a and ultrapure water 85b in the quartz cell 85, and is led by the condenser lens 86 to the detector 87. Absorbance A is calculated by an equation mentioned below based on absorbance I of the sample water and absorbance I of the ultrapure water which are values alternately output from the detector 87.

$$A = 1/1$$

When an appropriate value is selected for A, it is possible to judge whether or not water is contaminated with microbes and the like using the value as a boundary value.

For a reason described with reference to the measured results shown in FIG. 7, ultraviolet rays having wavelengths of 200 nm, 260 nm and 400 nm are used for detection.

A measurement with the ultraviolet ray having the wavelength of 200 nm gives approximately 0.050 as a value of A when protein (albumin) is at 0.5 ppm. Since a sensitivity is too high at A=0.050, it is appropriate to select A=0.300 at 200 nm.

The detecting-monitoring unit according to the present invention is capable of accurately judging safety of city water and permits safe use of city water under control of an amount of ultraviolet rays from the ultraviolet irradiation tank when any one of ultraviolet rays having the wavelengths of 200 nm, 260 nm and 400 nm from the light source is used. A is set at a value suited to a selected wavelength and the value of A is as a boundary value for judging presence/absence of microbes.

The apparatus according to the present invention which uses the composite filter according to the present invention separated into a plurality of layers functioning as independent filters facilitates exchange of the individual filters and permits selecting the individual filters dependently on contaminated degrees of water.

INDUSTRIAL APPLICABILITY

The composite filter according to the present invention manufactures water having a high purity by removing and making harmless granular impurities such as sand, microbes and bacteria from water passing through the composite filter. Accordingly, the method for manufacturing water having a high purity using the composite filter according to the present invention permits obtaining not only safe water for life and potable water but also water for medicine in inferior environments.

Furthermore, the apparatus according to the present invention has a relatively sample configuration, can be disposed at any district or any location and is capable of efficiently providing water having a high purity.

The invention claimed is:

1. A composite filter comprising:
   a first layer consisting of fibers or a glass filter;
   a second layer consisting of a mixture of cation exchange resin and either of zeolite or silica-alumina-based acid clay;
   a third layer consisting of activated carbon; and
   a fourth layer consisting of a nonwoven textile.

2. The composite filter according to claim 1, wherein said first layer, second layer, third layer and fourth layers are configured as independent filters respectively, and the independent filters are combined.

3. The composite filter according to claim 1, wherein a mixing ratio between the cation exchange resin and either of zeolite or silica-alumina-based acid clay is 50:50.

4. A method for manufacturing water having a high purity using the composite filter according to claim 1, 2 or 3 by
   pouring raw water into said composite filter and
   allowing the water to permeate through the composite filter.

5. The method for manufacturing water having a high purity using the composite filter according to claim 1 or 3, characterized in that fine particles in raw water are agglomerated by adding a flocculant to the raw water and pouring supernatant water into said composite filter.

6. A method for manufacturing water having a high purity using the composite filter according to claim 2, characterized in that sterilization is carried out by irradiating water to be supplied to said composite filter or water having passed through said composite filter with ultraviolet rays emitted from an ultraviolet lamp.

7. A water purifying apparatus using the composite filter according to claim 2 comprising:
   an inlet and an outlet for leading water to be purified into the apparatus and discharging purified water out of the apparatus; and
   a flow path connecting said inlet to said outlet, wherein a plurality of said independent filters are exchangeably disposed at appropriate locations in said flow path and wherein said apparatus is configured to dispose an optional combination of the independent filters corresponding to said first layer, second layer, third layer and fourth layer.

8. A method for manufacturing water having a high purity using the composite filter according to claim 1 or 3, characterized in that sterilization is carried out by irradiating water to be supplied to said composite filter or water having passed through said composite filter with ultraviolet rays emitted from an ultraviolet lamp.

9. The water purifying apparatus according to claim 7, characterized in that the apparatus comprises at least said second layer.

10. The water purifying apparatus according to claim 7 or 9 comprising:
    a purifying tank which has an inlet and an outlet for leading water to be purified and discharging led water, and
    at least a partition panel which is disposed in said purifying tank, wherein said partition panel is configured to have an end fixed in to a side wall surface of the purifying tank and the other end disposed with a definite gap between this end and the purifying tank so as to flow water through said gap and gaps of neighboring partition panels are disposed at ends alternately on opposite sides, thereby forming a flow path which flows water led from the inlet consecutively between a wall surface of the purifying tank and the partition panel, through said gap and/or between a wall surface of the purifying tank and the partition panel, through said gap and/or between next partition panels or between the partition panel and the purifying tank, and said independent filters are disposed in said flow path.

11. The water purifying apparatus according to claim 9, further comprising a sterilizing tank having
- an inlet,
- an outlet and
- an ultraviolet lamp disposed therein in addition to said purifying tank, wherein the outlet of said purifying tank is connected to the inlet of said sterilizing tank, thereby removing microorganisms such as bacteria remaining in water purified by the purifying tank.

12. The water purifying apparatus according to claim 11, wherein said sterilizing tank has at least a partition panel which has an end fixed to a side wall of said sterilizing tank and the other end disposed with a definite gap between this end and a wall surface of the sterilizing tank so as to form a flow path which flows water led from the inlet between the wall surface of the sterilizing tank and the partition panel, further through said gap and/or between partition walls or between the partition panel and the sterilizing tank, and at least an ultraviolet lamp is disposed in the flow path of said sterilizing tank, and said outlet is connected to said inlet so that water flowing out of the outlet of said purifying tank is led into the inlet of said sterilizing tank.

13. The water purifying apparatus according to claim 11, wherein a detector which detects harmful microorganisms is disposed in the vicinity of the outlet of said sterilizing tank and the ultraviolet lamp is turned on or off or an intensity of ultraviolet rays is changed dependently on detection of the harmful microorganisms by said detector.

14. The water purifying apparatus according to claim 12, wherein a detector which detects harmful microorganisms is disposed in the vicinity of the outlet of said sterilizing tank and the ultraviolet lamp is turned on or off or an intensity of ultraviolet rays is changed dependently on detection of the harmful microorganisms by said detector.

15. The purifying apparatus according to claim 13, wherein said detector detects the harmful microorganisms using ultraviolet rays which have any wavelength of 200 nm, 260 nm or 400 nm.

16. The water purifying apparatus according to claim 14, wherein a detector which detects harmful microorganisms is disposed in the vicinity of the outlet of said sterilizing tank and the ultraviolet lamp is turned on or off or an intensity of ultraviolet rays is changed dependently on detection of the harmful microorganisms by said detector.

17. The method for manufacturing water having a high purity according to claim 8, characterized in that sterilization is carried out by irradiating raw water with ultraviolet rays having wavelengths with a UV-C region from 200 nm to 280 nm.

18. The method for manufacturing water having a high purity according to claim 17, wherein said ultraviolet rays have a wavelength of 254 nm.

* * * * *